United States Patent
Krishnan et al.

(10) Patent No.: US 12,281,245 B2
(45) Date of Patent: Apr. 22, 2025

(54) MOISTURE CURABLE ADHESIVE COMPOSITIONS

(71) Applicant: Dow Global Technologies LLC, Midland, MI (US)

(72) Inventors: Bindu Krishnan, Lake Jackson, TX (US); Qiuyun Xu, Lake Jackson, TX (US); Leonardo C. Lopez, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 826 days.

(21) Appl. No.: 17/420,191

(22) PCT Filed: Jan. 3, 2020

(86) PCT No.: PCT/US2020/012182
§ 371 (c)(1),
(2) Date: Jul. 1, 2021

(87) PCT Pub. No.: WO2020/142688
PCT Pub. Date: Jul. 9, 2020

(65) Prior Publication Data
US 2022/0145147 A1  May 12, 2022

Related U.S. Application Data

(60) Provisional application No. 62/788,360, filed on Jan. 4, 2019.

(51) Int. Cl.
*C08G 18/12* (2006.01)
*C08G 18/24* (2006.01)
(Continued)

(52) U.S. Cl.
CPC ............ *C09J 175/08* (2013.01); *C08G 18/12* (2013.01); *C08G 18/244* (2013.01);
(Continued)

(58) Field of Classification Search
CPC .......... C08G 2170/00; C08K 2003/265; C08K 2201/011
See application file for complete search history.

(56) References Cited

U.S. PATENT DOCUMENTS 9,446,564 B2  9/2016  Pierson et al.
9,475,972 B2  10/2016  Sophiea
(Continued)

FOREIGN PATENT DOCUMENTS

JP  H07292341 A  11/1995
JP  H08218053 A  8/1996
(Continued)

OTHER PUBLICATIONS

Khaliullin, Comparative cytotoxicity of respirable surface-treated/untreated calcium carbonate rock dust particles in vitro, Toxicol Appl Pharmacol. 2019; 362: 67-76 (Year: 2019).*
(Continued)

*Primary Examiner* — Catherine S Branch
*Assistant Examiner* — Huihong Qiao

(57) ABSTRACT

An adhesive composition for use in flooring applications that includes a moisture curable polymer system; a calcium carbonate filler system having a first spheroidal particle of calcium carbonate having an equivalent spherical mean diameter of 70 nanometer (nm) to 15 micrometer (μm) and a second spheroidal particle of calcium carbonate having an equivalent spherical mean diameter of greater than 15 μm to 200 μm; a seed oil based fatty acid ester; and a silane based
(Continued)

adhesion promoter. The adhesive composition provides low viscosity along with high shear resistance, which helps to retain the troweled ridges to enable maximum coverage.

16 Claims, 5 Drawing Sheets

(51) Int. Cl.
| | | |
|---|---|---|
| *C08G 18/30* | (2006.01) | |
| *C08G 18/42* | (2006.01) | |
| *C08G 18/48* | (2006.01) | |
| *C08G 18/76* | (2006.01) | |
| *C08K 3/26* | (2006.01) | |
| *C08K 3/36* | (2006.01) | |
| *C08K 5/101* | (2006.01) | |
| *C08K 5/5435* | (2006.01) | |
| *C08K 7/18* | (2006.01) | |
| *C09J 175/06* | (2006.01) | |
| *C09J 175/08* | (2006.01) | |

(52) U.S. Cl.
CPC .......... *C08G 18/307* (2013.01); *C08G 18/42* (2013.01); *C08G 18/48* (2013.01); *C08G 18/7671* (2013.01); *C08K 3/26* (2013.01); *C08K 3/36* (2013.01); *C08K 5/101* (2013.01); *C08K 5/5435* (2013.01); *C08K 7/18* (2013.01); *C09J 175/06* (2013.01); *C08G 2170/00* (2013.01); *C08K 2003/265* (2013.01); *C08K 2201/003* (2013.01); *C08K 2201/011* (2013.01); *C08K 2201/014* (2013.01); *C08K 2201/019* (2013.01); *C09J 2203/314* (2013.01); *C09J 2301/30* (2020.08)

(56) References Cited

U.S. PATENT DOCUMENTS

| | | | |
|---|---|---|---|
| 10,017,674 | B2 | 7/2018 | Lontchar et al. |
| 2002/0198312 | A1 | 12/2002 | Kamemura et al. |
| 2003/0153671 | A1 | 8/2003 | Kaszubski et al. |
| 2005/0211580 | A1* | 9/2005 | Kaszubski ............. B32B 31/00 |
| | | | 206/223 |
| 2017/0240688 | A1* | 8/2017 | Kramer ................. C08G 18/75 |
| 2018/0237670 | A1 | 8/2018 | Lontchar et al. |
| 2018/0298619 | A1 | 10/2018 | Daley |
| 2020/0010746 | A1 | 1/2020 | Porter et al. |

FOREIGN PATENT DOCUMENTS

| | | |
|---|---|---|
| JP | H08218054 A | 8/1996 |
| JP | H10265759 A | 10/1998 |
| JP | 2005247924 A | 9/2005 |
| JP | 2007231037 A | 9/2007 |
| JP | 2009102624 A | 5/2009 |
| WO | 2012007417 | 1/2012 |
| WO | 2016050647 | 4/2016 |

OTHER PUBLICATIONS

International Search Report & Written Opinion for related PCT Application PCT/US2020/012182, mailed Sep. 10, 2020 (10 pgs).
International Preliminary Report on Patentability for related PCT Application PCT/US2020/012182, mailed Jul. 15, 2021 (6 pgs).

* cited by examiner

MOISTURE CURABLE ADHESIVE COMPOSITIONS

This application is a National Stage Application under 35 U.S.C. § 371 of International Application Number PCT/US2020/012182, filed Jan. 3, 2020 and published as WO 2020/142688 on Jul. 9, 2020, which claims the benefit to U.S. Provisional Application 62/788,360, filed Jan. 4, 2019, the entire contents of which are incorporated herein by reference in its entirety

FIELD OF DISCLOSURE

The present disclosure relates generally to adhesive compositions and more particularly to moisture curable adhesive compositions for use with flooring materials.

BACKGROUND

A wide variety of materials are available for use as floor coverings in residential and commercial applications. These most common flooring materials are carpet, wood and tile. Rubber flooring is also a versatile flooring option designed to add padding, resiliency and acoustic properties. Such flooring is used for high impact areas such as outdoor (playgrounds, parks) and indoor (garage, gymnasiums, hospitals etc.) applications. These flooring materials are installed over a wide variety of substrates such as concrete, plywood, particle or chip board, vinyl or ceramic tile and cement backer board, among other materials.

Installing flooring can be accomplished using mechanical fasteners such as nails or bolts, adhesives or mechanical locking systems. Mechanical fasteners are typically used with wood flooring. However mechanical locking systems are a very common adhesive free installation technique typically used for laminate floor installation. Though the return to service for both these installations are quick these methods have disadvantages such as poor acoustic properties, uneven connections, and buckling of the floors with varying climatic conditions of temperature and moisture. As a result, the use of adhesives has been the choice of installation method for most of these flooring materials. These elastomeric technologies include highly water based acrylates, polyurethane dispersions, moisture cure one component polyurethane, as well as two-component polyurethane and epoxy adhesives.

Flooring adhesives are manually applied to the floor using a notched trowel. This method of application ensures efficient coverage while maintaining good contact with the substrate. The troweling of the adhesive composition results in ridges with spacing which ensure that the adhesive composition spreads out evenly over the edges in the open area resulting in formation of a continuous layer of uniform thickness with complete coverage. The choice of the trowel is governed by the location of the floor area that is being installed, size, type of flooring and the coverage requirements. In addition to adhering the substrates together the adhesive composition layer also provides additional advantages such as barrier and acoustic properties. However, for flooring such as rubber, which have inherently better barrier and acoustic properties, adhesion is the main role played by the adhesive composition layer. Due to the surface unevenness of both the concrete/asphalt and rubber substrates, mechanical interlocking results in an excellent adhesion property. Hence the drive for the customer is to reduce the amount of adhesive composition and attain better coverage. Coverage is defined as the average uniform contact area. This can be attained by using a trowel of narrow dimension to apply the adhesive composition. However higher viscosity flooring adhesive compositions would maintain the ridges, but will be difficult to trowel. Lowering of viscosity to enable to use of trowel with narrow dimension, results in a flow-able system with poor ridge retention. Hence an optimum viscosity is required which will enable the efficient manual troweling while maintaining the ridges.

Another aspect to take into consideration is the effect of shear on these formulated systems. The installer in their attempt to get maximum coverage repeatedly shears the adhesive composition. These formulated systems are typically a homogenous mixture of liquid phase comprising of the polymers, diluents, solvents plasticizers, etc. and a solid phase comprising of the fillers, rheology modifiers, spacers, etc. Interaction such as polymer entanglements, Vander Waals forces and hydrogen bonding helps to retain the stability of the formulation as well as the flow-ability of the adhesive composition. The shear process can disrupt the forces resulting in the lowering of the viscosity of the adhesive composition and resulting in the adhesive composition behaving like a liquid and loss of the ridges. However, if the packing density of the adhesive composition is increased large amount of force and energy will be required to disrupt the phase structure to induce flow-ability. There is a need, therefore, to provide an adhesive composition with low viscosity to improve the ease of troweling with smaller notch trowels along with high shear resistance to retain the ridges while enabling maximum coverage.

SUMMARY

The present disclosure provides an adhesive composition for use in flooring applications that provides low viscosity along with high shear resistance, which helps to retain the troweled ridges to enable maximum coverage. The adhesive composition includes 20 to 50 weight percent (wt. %) of a moisture curable polymer system; 30 to 60 wt. % of a calcium carbonate filler system; 5 to 15 wt. % of a seed oil based fatty acid ester; and 0.1 to 10 wt. % of a silane based adhesion promoter, where the wt. % of the moisture curable polymer system, the calcium carbonate filler system, the seed oil based fatty acid ester and the silane based adhesion promoter are based on the total weight of the adhesive composition. The calcium carbonate system has 5 to 50 wt. % of a first spheroidal particle of calcium carbonate having an equivalent spherical mean diameter of 70 nanometer (nm) to 15 micrometer (μm); and 50 to 95 wt. % of a second spheroidal particle of calcium carbonate having an equivalent spherical mean diameter of greater than 15 μm to 200 μm, where the wt. % of the first spheroidal particle and the second spheroidal particle are based on the total weight of the calcium carbonate filler system. For the various embodiments, the adhesive composition can further include a silica based rheology modifier. For example, the adhesive composition can further include 0.5 to 4 wt. % of a silica based rheology modifier, wherein the wt. % is based on the total weight of the adhesive composition.

A variety of moisture curable polymer systems can be used with the adhesive compositions of the present disclosure. For example, the moisture curable polymer system is a reaction product of an isocyanate component and a polyol component, where the moisture curable polymer system has a free isocyanate content (% NCO) from 1 weight percent (wt. %) to 14 wt. %. For the various embodiments, the moisture curable polymer system can be one that is solvent free.

The polyol component is selected from the group consisting of a polyether polyol, a polyester polyol and a combination thereof. The polyether polyol and/or a polyester polyol can be uncapped or capped using ethylene oxide (E0) and/or propylene oxide (PO) so as to provide hydrophilic or hydrophobic structures, as discussed herein.

For the various embodiments, the polyol component has a number average molecular weight of 1,000 g/mol to 6,000 g/mol. For the various embodiments, the isocyanate component is selected from the group consisting of an aromatic diisocyanate, an aliphatic diisocyanate, a cycloaliphatic diisocyanate and combinations thereof.

For the various embodiments, the isocyanate component has number average molecular weight of 500 g/mol to 12,000 g/mol. The isocyanate component can be monomeric and/or polymeric, as are known in the art.

Embodiments of the present disclosure also include those in which the calcium carbonate filler system does not include an aluminum silicate. A specific example of the seed oil based fatty acid ester includes a methyl ester produced from soybean oil. The use of other seed oils may also be possible, as provided herein.

For the various embodiments, the adhesive composition of the present application has a viscosity of 500 Pa·s to 10000 Pa·s at 0.01 l/s shear rate. Preferably, the adhesive composition of the present application has a viscosity 800 Pa·s and 5000 Pa·s at 0.01 l/s shear rate. The adhesive composition of the present disclosure also includes a cross-over point between 0.5 hz and 25 hz in an uncured state. The viscosity and cross-over point of the adhesive composition is measured at a steady state flow step at 25° C. isothermal temperature with a shear rate ramp from 100 Hz to $10^{-5}$ Hz, as described in the Examples section.

DETAILED DESCRIPTION

Figure 1:
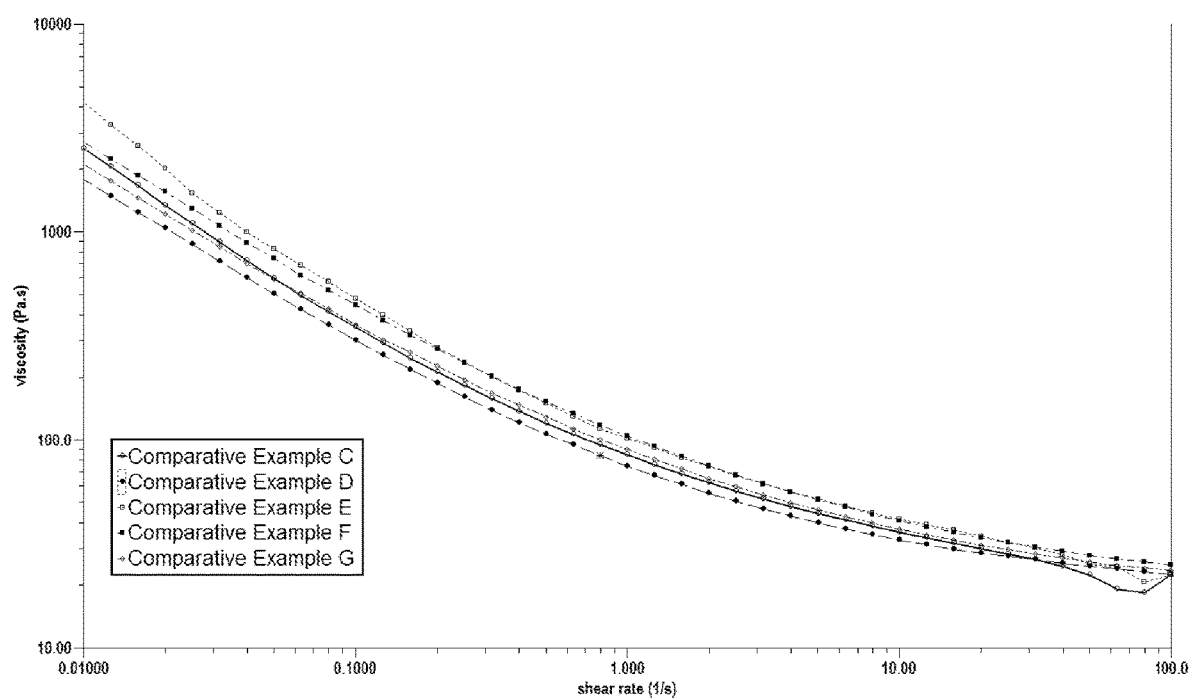
FIG. 1 provides the viscosity of Comparative Examples C-G seen in Table 2 as a function of shear rate.

The present disclosure provides an adhesive composition for use in flooring applications that provides low viscosity along with high shear resistance, which helps to retain the troweled ridges to enable maximum coverage. The adhesive composition of the present disclosure can be used to secure a variety of floor covering materials (e.g., carpet, wood, rubber and tile) to a variety of substrates such as concrete, plywood, particle or chip board, vinyl or ceramic tile or cement backer board, among other materials. The adhesive composition of the present disclosure provides for both a viscosity and other rheological properties that allow for ease of manual application (e.g., with a notched trowel) while providing and retaining the desired ridges and viscosity even after multiple shearing events. In short, the adhesive composition of the present disclosure provides the desired combination of low viscosity to improve the ease of troweling with smaller notch trowels along with high shear resistance and which will retain the ridges to enable maximum coverage.

The adhesive composition includes 20 to 50 weight percent (wt. %) of a moisture curable polymer system; 30 to 60 wt. % of a calcium carbonate filler system; 5 to 15 wt. % of a seed oil based fatty acid ester; and 0.1 to 10 wt. % of a silane based adhesion promoter, where the wt. % of the moisture curable polymer system, the calcium carbonate filler system, the seed oil based fatty acid ester and the silane based adhesion promoter are based on the total weight of the adhesive composition. The calcium carbonate system has 5 to 50 wt. % of a first spheroidal particle of calcium carbonate having an equivalent spherical mean diameter of 70 nanometer (nm) to 15 micrometer (μm); and 50 to 95 wt. % of a second spheroidal particle of calcium carbonate having an equivalent spherical mean diameter of greater than 15 μm to 200 μm, where the wt. % of the first spheroidal particle and the second spheroidal particle are based on the total weight of the calcium carbonate filler system. For the various embodiments, the adhesive composition can further include a silica based rheology modifier. For example, the adhesive composition can further include 0.5 to 4 wt. % of a silica based rheology modifier, wherein the wt. % is based on the total weight of the adhesive composition.

Moisture Curable Polymer System

As discussed herein, the adhesive composition includes 20 to 50 wt. % of a moisture curable polymer system. Other preferred wt. % ranges for the moisture curable polymer system as used in the adhesive composition include 20 to 40 wt. %; 20 to 30 wt. %; 30 to 50 wt. %; 30 to 40 wt. % and 40 to 50 wt. %, where the wt. % is based on the total weight of the adhesive composition.

For the various embodiments, the moisture curable polymer system provided herein can be one that is solvent free. As used herein, a "solvent" is defined as a low molecular weight organic compounds having a boiling point of below 200° C. at atmospheric pressure (1 bar) in amounts of preferably less than 0.5% by weight, with particular preference less than 0.1% by weight, with very particular preference less than 0.05% by weight and, in particular, less than 0.01% by weight. Solvents are typically added to high viscosity polymer to solubilize the polymers and lower the viscosity of the formulations. Typically, organic solvents used in adhesive formulation are benzene, toluene, ethyl acetate, butyl acetate, propyl acetate, methyl ethyl ketone, methyl isobutyl ketone, 2-methoxypropyl acetate, N-methylpyrrolidone. To minimize the use of hazardous chemicals in the preparation of floor adhesives and to reduce the volatile organic compound (VOC) and hazardous air pollutant (HAP) emissions these solvents were not used.

A variety of moisture curable polymer systems can be used with the adhesive compositions of the present disclosure. For example, the moisture curable polymer system is a reaction product of an isocyanate component and a polyol component, where the moisture curable polymer system has a free isocyanate content (% NCO) from 1 weight percent (wt. %) to 14 wt. %. For the various embodiments, the moisture curable polymer system is formed by combining an excess of an isocyanate (e.g., a diisocyanate) with an isocyanate-reactive composition (e.g., a polyol), where one of the isocyanate (NCO) groups of the isocyanate component reacts with one of the hydroxyl (OH) groups of the polyol. The other end of the polyol reacts with another isocyanate, where the resulting isocyanate prepolymer has an isocyanate group on both ends. The moisture curable polymer system can be a diisocyanate itself, but has a greater molecular weight, a higher viscosity, a lower isocyanate content by weight (% NCO), and a lower vapor pressure as compared to the isocyanate used in forming the moisture curable polymer system. In addition to a diol, a triol or higher functional polyol could also be used for the polyol in the reaction, as long as an excess amount of diisocyanate is used. Molar ratios of diisocyanate to polyol greater than two to one can also be used in forming the moisture curable polymer system.

For the various embodiments, the polyol component used in forming the moisture curable polymer system can include a polyol selected from the group consisting of a polyether polyol, a polyester polyol and a combination thereof. The polyether polyol and/or a polyester polyol can also be uncapped or capped using ethylene oxide (EO) and/or propylene oxide (PO), as known in the art, so as to provide hydrophilic or hydrophobic structures, as discussed herein. For the embodiments, the polyether polyol can include those having at least 2, such as 2 or 3 hydroxyl groups per molecule and may be prepared, for example, by polymerization of epoxides, such as ethylene oxide, propylene oxide, butylene oxide, tetrahydrofuran, styrene oxide or epichlorohydrin, either on their own, in the presence of $BF_3$, or by a process of chemical addition of these epoxides, optionally as mixtures (such as mixtures of ethylene oxide and propylene oxide) or successively, to starting components having reactive hydrogen atoms, such as water, ammonia, alcohols, or amines. Examples of suitable starting components include ethylene glycol, propylene glycol-(1,3) or -(1,2), glycerol, trimethylolpropane, 4,4'-dihydroxy-diphenylpropane, aniline, ethanolamine or ethylene diamine. Sucrose-based polyether polyols may also be used. It is in many cases preferred to use polyethers which contain predominant amounts of primary OH groups (up to 90%, by weight, based on all the OH groups present in the polyether).

Examples of polyester polyol include those formed as a reaction product of polyhydric, such as dihydric alcohols and/or trihydric alcohols, and polybasic, such as dibasic, carboxylic acids. Instead of free polycarboxylic acids, the corresponding polycarboxylic acid anhydrides or corresponding polycarboxylic acid esters of lower alcohols or mixtures thereof may be used. The polycarboxylic acids may be aliphatic, cycloaliphatic, aromatic and/or heterocyclic and they may be substituted, e.g. by halogen atoms, and/or may be unsaturated. Suitable exemplary polycarboxylic acids include, but are not limited to, succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters.

Exemplary suitable polyhydric alcohols include, but are not limited to, ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxy-methylcyclohexane), 2-methyl-1,3-propane-diol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as s-caprolactone, or hydroxycarboxylic acids, such as co-hydroxycaproic acid, may also be used.

Such polyol components may also comprise polycarbonate polyols, such as the reaction product of diols, such as propanediol-(1,3), butanediol-(1,4) and/or hexanediol-(1,6), diethylene glycol, triethylene glycol or tetraethylene glycol, with diarylcarbonates, such as diphenylcarbonate, or phosgene.

The polyol component can have a number average molecular weight of 1,000 g/mol to 6,000 g/mol. Other number average molecular weight values may also be possible. The number average molecular weight values reported herein are determined by end group analysis, as is known in the art.

Other examples of suitable polyols include those polymers or copolymers formed with propylene oxide that have a hydroxyl equivalent weight of at least 300. The propylene oxide may be 1,3-propylene oxide, but more typically is 1,2-propylene oxide. If a copolymer, the comonomer is another copolymerizable alkylene oxide such as, for example, ethylene oxide, 2,3-butylene oxide, tetrahydrofuran, 1,2-hexane oxide, and the like. A copolymer may contain 75% or more by weight, preferably 85% or more polymerized propylene oxide, based on the total weight of polymerized alkylene oxides. A copolymer preferably contains no more than 15%, especially no more than 5% by weight polymerized ethylene oxide. The polymer or copolymer of propylene oxide should have a nominal functionality of at least 2.0. The nominal functionality preferably is 2.5 to 6, more preferably 2.5 to 4 or 2.5 to 3.3. The hydroxyl equivalent weight of the polymer or copolymer of propylene oxide is at least 300, preferably at least 500, more preferably 500 to 3200, in some embodiments 600 to 3000 and in particular embodiments from 800 to 2500. The polyol can also be formed of a blend, where the polyol blend includes a blend of the diol and triol. The diol can have an average molecular weight (Mw) of 500 to 8,000 grams/mole and a triol having an average molecular weight (Mw) of 2500 to 6500 grams/mole, In various embodiments, the polyol component can have a hydroxyl number of from 10 mg KOH/g to 700 mg KOH/g. In still other embodiments, the polyol component has a hydroxyl number of from 15 mg KOH/g to 100 mg KOH/g, or from 20 mg KOH/g to 50 mg KOH/g. As used herein, a hydroxyl number is the milligrams of potassium hydroxide equivalent to the hydroxyl content in one gram of the polyol or other hydroxyl compound. The polyol can also have a number averaged isocyanate reactive group functionality of 1.6 to 6, such as 2 to 6 or 3 to 5.

In the present disclosure, other isocyanate-reactive compositions besides the polyol component can be used in forming the moisture curable polymer system of the present disclosure. This allows for a two component system for the moisture curable polymer system, where the amine can be used as the curative agent in place or in addition to the polyol as provided herein. Such isocyanate-reactive compositions can include an aromatic diamine, such as those which contain at least one alkyl substituent in the ortho-position to a first amino group and two alkyl substituents in the ortho-position to a second amino group or mixtures thereof. In some embodiments, at least two of the alkyl substituents contain at least two carbon atoms. In certain embodiments, the reactivity of the diamine towards isocyanates has not been reduced by electron attracting substituents, such as halogen, ester, ether or disulphide groups, as is the case, for example, with methylene-bis-chloroaniline (MOCA). In certain embodiments, such diamines do not contain other functional groups reactive with isocyanates. In certain embodiments, the foregoing mentioned alkyl substituent can have as many as twenty carbon atoms and can be straight or branched long chains.

In certain embodiments, the aromatic diamine contains at least one alkyl substituent in the ortho-position to a first amino group and two alkyl substituents having from 1 to 3 carbon atoms in the ortho-position to a second amino group, provided that two of these alkyl substituents contain two or three carbon atoms. Examples of such aromatic diamines include: 1-methyl-3,5-diethyl-2,4-diaminobenzene, 1-methyl-3,5-diethyl-2,6-diaminobenzene, 1,3,5-triethyl-2,6-diaminobenzene, and 3,5,3',5'-tetraethyl-4,4'-diaminodiphenylmethane.

The above-mentioned aromatic amines may, of course, be used as mixtures with each other or in combination with other active aromatic amines.

In certain embodiments, aromatic diamines which have a linear alkyl substituent having from 1 to 3 carbon atoms in both ortho-positions to each amino group, provided that two of the alkyl substituents contain two or three carbon atoms, are used. In some embodiments, the diamine is liquid at room temperature and miscible with polyols, particularly with polyether polyols. An example of such a compound is 1-methyl-3,5-diethyl-2,4-diaminobenzene or a mixture of this compound with 1-methyl-3,5-diethyl-2,6-diaminobenzene.

In certain embodiments of the present disclosure, the isocyanate-reactive composition can also include aminosilanes, as are known in the art.

For the various embodiments, the isocyanate component is selected from the group consisting of an aromatic diisocyanate, an aliphatic diisocyanate, a cycloaliphatic diisocyanate and combinations thereof. For the various embodiments, the isocyanate component has a number average molecular weight of 500 g/mol to 12,000 g/mol. The isocyanate component can be monomeric and/or polymeric, as are known in the art. In addition, the isocyanate component can have an isocyanate equivalent weight of 135 to 170, and the so-called MDI products, which are a mixture of isomers of diphenylmethanediisocyanate (MDI) in monomeric MDI or the so called polymeric MDI products, which are a mixture of polymethylene polyphenylene polyisocyanates in monomeric MDI.

Examples of the isocyanate component used in forming the moisture curable polymer system include aromatic, aliphatic, and/or cycloaliphatic isocyanates, as noted herein. Aromatic, aliphatic, and/or cycloaliphatic isocyanates can include monomeric organic diisocyanates represented by the formula, R(NCO)$_2$, where R represents an organic group, such as a divalent aliphatic hydrocarbon group having from 2 to 6 carbon atoms, a divalent cycloaliphatic hydrocarbon group having from 5 to 9 carbon atoms, or a divalent aromatic hydrocarbon group having 5 to 10 carbon atoms. Other suitable examples of the isocyanate component include polyisocyanates such as aromatic, aliphatic and cycloaliphatic polyisocyanates. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI (H12 MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate.

Any of the foregoing polyisocyanates may be modified to include urea, isocyanurate, uretidinedione, allophonate, biuret, carbodiimide, urethane or other linkages.

Examples of suitable diisocyanates used in forming the moisture curable polymer system include: 1,4-tetra-methylene diisocyanate; 1,6-hexamethylene diisocyanate (HDI); 2,2,4-trimethyl-1,6-hexamethylene diisocyanate; 1,12-dodecamethylene diisocyanate; cyclohexane-1,3- and -1,4-diisocyanate; 1-isocyanato-2-isocyanatomethyl cyclopentane; 1-isocyanato-3-isocyanatomethyl-3,5,5-trimethyl-cyclohexane (isophorone diisocyanate or IPDI), bis-(4-isocyanato-cyclohexyl)-methane; 1,3- and 1,4-bis-(isocyanatomethyl)-cyclohexane; bis-(4-isocyanatocyclo-hexyl)-methane; 2,4'-diisocyanato-dicyclohexyl methane; bis-(4-isocyanato-3-methyl-cyclohexyl)-methane; α,α,α',α'-tetramethyl-1,3- and/or -1,4-xylylene diisocyanate; 1-isocyanato-1-methyl-4(3)-isocyanatomethyl cyclohexane; 2,4- and/or 2,6-hexahydro-toluylene diisocyanate; 1,3- and/or 1,4-phenylene diisocyanate; 2,4- and/or 2,6-tolune diisocyanate; 2,2-, 2,4- and/or 4,4'-diphenylmethane diisocyanate (MDI) or higher homologs of MDI (polymeric MDI); 1,5-diisocyanato naphthalene; and combinations of any thereof. The 2,4' and 4,4' isomers of MDI may be present in the isocyanate component in a weight ratio from 1:100 to 50:50. For example, the 2,4' isomer of MDI may be present in an amount from 1 wt. % to 50 wt. % (e.g., 1.25 wt. % to 50 wt. %, 1.3 wt. % to 35 wt. %, 1.5 wt. % to 30 wt. %, etc.), based on a total weight of the isocyanate component. A weight percentage of the 4,4' isomer of MDI may be greater than a weight percentage of the 2,4' isomer of MDI, based on a total weight of the isocyanate component. For example, a formulation for forming the MDI based prepolymer has a 2,4' isomer MDI content from 1.5 wt. % to 40 wt. % (e.g., 1.5 wt. % to 30 wt. %) and a remainder of the 4,4' isomer of MDI based on a total weight of 100 wt. % of the formulation for forming the polyurethane prepolymer. According to some embodiments, a balance of the isocyanate component that is not accounted for with the 4,4' isomer of MDI and/or the 2,4' isomer of MDI may include toluene diisocyanate (TDI), hexamethylene diisocyanate (HDI), isophorone diisocyanate (IIPDI), polymethylene polyphenylisocyanate, carbodiimide or allophonate or uretonimine adducts of methylene diphenylisocyanate and mixtures thereof.

Monomeric isocyanates containing three or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used in forming the moisture curable polymer system. Also suitable are isocyanate adducts prepared from monomeric isocyanates and containing isocyanurate, uretdione, biuret, urethane, allophanate, iminooxadiazine dione, carbodiimide, and/or oxadiazinetrione groups. In certain embodiments, the isocyanate has a viscosity, at 25° C., of no more than 300 mPa·s, when measured using a Brookfield DVE viscometer.

The moisture curable polymer system is prepared in a conventional way by combining the isocyanate component and the polyol component (e.g., the polyether polyol) at 20 to 100° C. and, in some embodiments, in the presence of urethane-forming catalyst, such as a tertiary amine or tin compound. The relative amounts of the isocyanate component and the polyol component are chosen in such a way as to arrive at the desired free NCO content of the final product.

In general, the equivalent amount of diisocyanate will be higher than the equivalent amount of the polyol component. In certain embodiments of the present disclosure, the isocyanate and the polyol component are each used in amounts such that the moisture curable polymer system produced with the isocyanate component and the polyol component has a free isocyanate content (% NCO) from 1 weight percent (wt. %) to 14 wt. %. The free isocyanate content is (% NCO) determined and achieved during production of the moisture curable polymer system, as known in the art (e.g., by taking the mass due to unreacted NCO groups, divided this mass by the total mass of the isocyanate and isocyanate-reactive composition and then multiplying the result 100 to give the % NCO). The moisture curable polymer system produced also preferably has a viscosity in the range of 1,000 to 10,000 mPa·s or 1,000 to 5,000 mPa·s measured at 20° C. using a Brookfield DVE viscometer.

The moisture curable polymer system can react with water, where such water can be present in the air of the space in which the adhesive composition of the present disclosure is being used. Preferably, the amount of water used is in molar excess of the isocyanate groups available for reaction in the moisture curable polymer system.

Calcium Carbonate Filler System

The adhesive composition further includes 30 to 60 wt. % of a calcium carbonate filler system. Other preferred wt. % ranges for the calcium carbonate filler system as used in the adhesive composition include 30 to 50 wt. %; 30 to 40 wt. %; 40 to 60 wt. %; 40 to 50 wt. % and 50 to 60 wt. %, where the wt. % is based on the total weight of the adhesive composition. For the various embodiments, the calcium carbonate filler system does not include an aluminum silicate.

For the various embodiments, the calcium carbonate filler system includes calcium carbonate ($CaCO_3$) having a spheroidal shape. As used herein, a spheroidal shape includes prolate spheroids, oblate spheroids and/or spheres. For the various embodiments, two groups of the spheroidal particles of calcium carbonate constitute the calcium carbonate filler system of the present disclosure. Specifically, the calcium carbonate filler system is formed from a first spheroidal particle of calcium carbonate having an equivalent spherical mean diameter of 70 nanometer (nm) to 15 micrometer (μm); and a second spheroidal particle of calcium carbonate having an equivalent spherical mean diameter of greater than 15 μm to 200 μm. It is appreciated that while a single value for the equivalent spherical mean diameter for each of the first spheroidal particle and the second spheroidal particle is given, each have a size distribution where the wt. % of calcium carbonate particles having an equivalent spherical mean diameter of 45 μm or greater (Plus 325 Mesh, wt. %) for a given size of either the first spheroidal particle or the second spheroidal particle is from 0.003 wt. % to 0.8 wt. % for the first spheroidal particle and from 8 to 20 wt. % for the second spheroidal particle.

Preferably, the calcium carbonate filler system is formed from the first spheroidal particle of calcium carbonate having an equivalent spherical mean diameter of 1 μm to 10 μm and the second spheroidal particle of calcium carbonate having an equivalent spherical mean diameter of 15 μm to 40 μm, where the wt. % of the first spheroidal particle and the second spheroidal particle are based on the total weight of the calcium carbonate filler system. More preferably, the calcium carbonate filler system is formed from the first spheroidal particle of calcium carbonate having an equivalent spherical mean diameter of 2 μm to 5 μm and the second spheroidal particle of calcium carbonate having an equivalent spherical mean diameter of 20 μm to 30 μm, where the wt. % of the first spheroidal particle and the second spheroidal particle are based on the total weight of the calcium carbonate filler system. In one specific embodiment, the calcium carbonate filler system is formed from the first spheroidal particle of calcium carbonate having an equivalent spherical mean diameter of 3 μm and the second spheroidal particle of calcium carbonate having an equivalent spherical mean diameter of 25 μm.

For the various embodiments, the calcium carbonate filler system has 5 to 50 wt. % of the first spheroidal particle of calcium carbonate having the equivalent spherical mean diameter of 70 nm to 15 μm, as described herein, and 50 to 95 wt. % of the second spheroidal particle of calcium carbonate having the equivalent spherical mean diameter of greater than 15 μm to 200 μm, as described herein. Preferably, the calcium carbonate filler system has 25 to 50 wt. % of the first spheroidal particle of calcium carbonate having the equivalent spherical mean diameter of 70 nm to 15 μm, as described herein, and 50 to 75 wt. % of the second spheroidal particle of calcium carbonate having the equivalent spherical mean diameter of greater than 15 μm to 200 μm, as described herein. In one preferred embodiment, the calcium carbonate filler system has 50 wt. % of the first spheroidal particle of calcium carbonate having the equivalent spherical mean diameter of 70 nm to 15 μm, as described herein, and 50 wt. % of the second spheroidal particle of calcium carbonate having the equivalent spherical mean diameter of greater than 15 μm to 200 μm, as described herein. In another preferred embodiment, the calcium carbonate filler system has 25 wt. % of the first spheroidal particle of calcium carbonate having the equivalent spherical mean diameter of 70 nm to 15 μm, as described herein, and 75 wt. % of the second spheroidal particle of calcium carbonate having the equivalent spherical mean diameter of greater than 15 μm to 200 μm, as described herein.

The wt. % of the first spheroidal particle and the second spheroidal particle provided herein are based on the total weight of the calcium carbonate filler system. For the calcium carbonate filler system provided herein, the wt. % of both the first spheroidal particle and the second spheroidal particle total 100 wt. %. In other words, no other filler(s) are present in the calcium carbonate filler system provided herein.

In an alternative embodiment, other fillers that can be used with the calcium carbonate filler system include, but are not limited to one or more of precipitated and colloidal calcium carbonates, reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black, graphite, mica, talc, and the like. When such additional fillers are present (i.e., if other fillers are present in the calcium carbonate filler system), the calcium carbonate filler system and the other fillers comprise 20 to 80, more typically 30 to 70 and even more typically 40 to 60, wt. % of the total weight of the adhesive composition.

Seed Oil Based Fatty Acid Ester

The adhesive composition further includes 5 to 15 wt. % of a seed oil based fatty acid ester, where the wt. % is based on the total weight of the adhesive composition, where the seed oil based fatty acid ester acts as a plasticizer. The seed oil based fatty acid ester of the present disclosure is a fatty acid ester that is produced by the transesterification of a seed oil that replaces the glycerol component of the seed oil with a different alcohol. A preferred example of the seed oil includes soybean oil. Other examples of vegetable oils that may also be useful include, but are not limited to, those from castor, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination of two or more of these oils. The use of other seed oils in also possible. Examples of animal products that might be useful include lard, beef tallow, fish oils and mixtures of two or more of these products. Additionally, oils obtained from organisms such as algae may also be used. Combination of vegetable, algae, and animal based oils/fats may also be used.

Examples of the alcohol used in the transesterification include one or more of an organic mono- or poly-alcohol including a $C_1$ to $C_{18}$ organic moiety. More preferably, the alcohol is a $C_1$ to $C_6$ mono-alcohol, where the C4 to C6 group, when present, can be a straight or branched chain alkyl group. The most preferred alcohols are selected from methanol, ethanol, propanol, isopropanol, butanol, and mixtures thereof, with methanol normally being used.

As appreciated and known in the art, the seed oil based fatty acid ester can be prepared by the transesterification of the seed oil, during which the triglyceride of the seed oil reacts with the alcohol in the presence of a strong acid or base, producing a mixture of fatty acids alkyl esters and glycerol. Preferably, methanol is used in the transesterification process to produce a fatty acid methyl ester. For example, in one preferred embodiment the seed oil based fatty acid ester is a methyl ester produced from soybean oil. A commercial example of the preferred methyl ester produced from soybean oil includes a soybean oil methyl ester sold under the trade designator SOYGOLD available from CHEMPOINT, where SOYGOLD 1100 is one preferred example of the soybean oil methyl ester.

Silane Based Adhesion Promoter

The adhesive composition further includes 0.1 to 10 wt. % of a silane based adhesion promoter, where the wt. % is based on the total weight of the adhesive composition. The silane based adhesion promoter of the present disclosure can be a bi-functional silanol coupling agent having terminal reactive groups of an amine, an isocyanate or an epoxy group. Suitable examples include 3-glycidoxypropyltrimethoxysilane (GLYMO), glycidoxypropyltriethoxysilane (GLEO) isocyanatopropyltrimethoxysilane or combinations thereof. Examples of other useful adhesion promoters include N-2-aminoethyl-3-aminopropyltriethoxysilane, gamma-aminopropyltriethoxysilane, gamma-aminopropyltrimethoxysilane, aminopropyltrimethoxysilane, bis-gamma-trimethoxysilypropyl)amine, N-phenyl-gamma-aminopropyltrimethoxysilane, triaminofunctionaltrimethoxysilane and gamma-aminopropyl-methyldiethoxysilane. The composition typically comprises, if present, 0.1 to 10, more typically 0.5 to 8 and even more typically 1 to 6 wt. % of the adhesion promoter.

Optional Additives

For the various embodiments, the adhesive composition can further include optional additives. For example, the adhesive composition can further include 0.5 to 4 wt. % of a silica based rheology modifier, wherein the wt. % is based on the total weight of the adhesive composition. Examples of the silica based rheology modifier include polydimethylsiloxane treated fumed silica such as those commercially available under the trade designator AEROSIL R202 or AEROSIL R805 (EVONIK).

The adhesive composition may further include a variety of other optional additives, where when present the optional additives may be present in an amount from 0.1 wt. % to 5 wt. % based on a total weight of the adhesive composition. Examples of the optional additives include, but are not limited to, a zeolite such as a molecular sieve powder (e.g., available from W. R. Grace under the trade name SYLOSIV). For example, the zeolite may be a crystalline aluminosilicate. An amount of the zeolite may be from 0.1 wt. % to 2 wt. %, based on the total weight of the adhesive composition. Additional examples of optional additives further include a catalyst for promoting reactions between free isocyanate of the adhesive composition and atmospheric moisture such that the reaction between the isocyanate(s) and the isocyanate reactive component occurs when the adhesive composition is dispensed from the can or cylinder. Examples of such catalysts include amine catalysts, metal complexes, or combinations thereof. The catalyst may be present in an amount of from 0.01 wt. % to 1 wt. %, from 0.05 wt. % to 0.5 wt. %, 0.1 to 1 wt. % or from 0.1 wt. % to 0.2 wt. % based on the total weight of the adhesive composition.

Amine catalysts may include organic compounds that contain at least one tertiary nitrogen atom (e.g., a tertiary amine) and are capable of catalyzing the free isocyanate groups in the adhesive composition. Examples include amidines or guanidines, such as for example 1,4-diazabicyclo[2.2.2]octane (DABCO), 1,8-diazabicyclo[5.4.0]undec-7-ene (DBU), triethylenediamine, tetramethylethylenediamine, pentamethyldiethylene triamine, bis(2-dimethylaminoethyl)ether, triethylamine, tripropylamine, tributylamine, triamylamine, pyridine, quinoline, dimethylpiperazine, piperazine, N,N-dimethylcyclohexylamine, N-ethyl-morpholine, 2,2'-dimorpholinodiethylether ("DMDEE"), 2-methylpropanediamine, methyltriethylenediamine, 2,4,6-tri(dimethylamino methyl) phenol, N,N',N''-tris(dimethylamino-propyl)sym-hexahydrotriazine, and mixtures thereof. In further embodiments, the amine catalyst includes bis(2-dimethylamino-ethyl) ether, dimethylcyclohexylamine, N,N-dimethyl-ethanolamine, triethylenediamine, triethylamine, 2,4,6-tri(dimethylaminomethyl)phenol, N,N',N-ethylmorpholine, organometallic catalysts based on tin, zinc and bismuth, for example dibutyltin dilaurate and/or mixtures thereof.

Additional optional additive include, but are not limited to, a pigment, a flame retardant, an antibacterial agent, a thermostabilizing agent, paraffins or fatty alcohols or dimethylpolysiloxanes, chain extender, additional rheology additives, dyes, adhesion promoters, stabilizers against ageing and weathering, plasticizers, fungistatic and bacteriostatic substances.

Embodiments of the present disclosure also provide for a method of making the adhesive composition of the present disclosure. Methods of preparing the adhesive composition of the present disclosure can include the following procedure. Charge both the moisture curable polymer system and the seed oil based fatty acid ester according to wt. % provided herein into a mixing unit (e.g., a Myers mixer or Ross mixer) and mix at a low rpm setting of 40 to 60 rpm for about 30 minutes under a vacuum (26 inches Hg, 88 KPa) until the mixture is clear and no bubbles are visible. Next, heat the mixture to about 40° C. to 45° C., after which the powdered molecular sieve (e.g., GRACE Sylosiv A3) is added to the mixture. Increase the rpm of the mixer to 70 to 80 rpm under a vacuum (26 inches Hg, 88 KPa) for about 30 minutes to allow all the powder to wet, after which the first spheroidal particle of calcium carbonate is added. After mixing in the first spheroidal particle, the second spheroidal particle of calcium carbonate is added to the mixture and the temperature of the mixture is reduced to below 40° C. (e.g., 30° C.), where if the second spheroidal particles are added in multiple charges a low rpm (e.g., 40 rpm) is used after each charge followed by high shear (e.g., 4000 rpm) for 1 to 2 minutes to wet the solids completely. After all solids are charged, apply the vacuum (26 inches Hg, 88 KPa) and alternate agitate with low shear (e.g., 40 rpm) and high shear (e.g., 4000 rpm) for a total of about 30 minutes. After the 30 minutes, visually inspect the mixture to ensure the mixture is a smooth paste with no visible solids (if solids visible mix under high shear for an additional 10 minutes). Next, add the rheology modifier (e.g., fumed silica) to the mixture and mix under a low shear (e.g., mixing at 10 to 60 rpm) to wet the rheology modifier. Then, apply a vacuum (26 inches Hg, 88 KPa) using only the low shear (e.g., mixing at 10 to 60 rpm) for 30 minutes at the reduced temperature (e.g., below 40° C., such as 30° C.). After the 30 minutes check the mixture to confirm that it is a smooth paste with no visible solids. If solids are detected, mix for additional 10 minutes using only the low shear (e.g., mixing at 10 to 60 rpm). Next, add the silane based adhesive promoter and catalyst to the mixture and mix under low shear (e.g., mixing at 10 to 60 rpm) under vacuum (26 inches Hg, 88 KPa) for 15 minutes. Package the adhesive composition of the present disclosure in an air and moisture tight container for subsequent use.

For the various embodiments, the adhesive composition of the present application has a viscosity of 500 Pa·s to 10000 Pa·s at 0.01 l/s shear rate. Preferably, the adhesive composition of the present application has a viscosity 800 Pa·s and 5000 Pa·s at 0.01 l/s shear rate. The adhesive composition of the present disclosure also includes a cross-over point between 0.5 hz and 25 hz in an uncured state. The viscosity and cross-over point of the adhesive composition is measured at a steady state flow step at 25° C. isothermal temperature with a shear rate ramp from 100 Hz to $10^{"5}$ Hz, as described in the Examples section.

Some embodiments of the disclosure will now be described in detail in the following Examples.

EXAMPLES

In the Examples, various terms and designations for materials were used including, for example, the following:

TABLE 1

| Raw materials: Role and details | | | | | |
|---|---|---|---|---|---|
| Ingredients | Role | Details | Equivalent Spherical Mean Diameter | Plus 325 Mesh, % | Supplier |
| Prepolymer | Polymer | Isocyanate terminated prepolymers prepared with VORANOL ™ 2000LM (diol polyol) and VORANOL ™ CP6001 (triol polyol) and ISONATE 50 OP (isocyanate), as discussed below. | | | The Dow Chemical Company |
| SOYGOLD ® 1100 | plasticizer | Methyl ester, Soybean oil (Plasticizer) | | | Ag processing Inc. |
| Jayflex ™ DINP | plasticizer | Diisononyl phthalate | | | ExxonMobil |
| CC-103* | Filler | Calcium carbonate (25 μm) Filler, broad distribution with max of 100 μm size. | 25 μm | 20 | IMERYS Carbonates |
| KaMIN ® 100** | | Aluminum silicate (3.2 μm) Filler | 3.2 μm | 0.01 | KaMin Performance Minerals |
| Atomite** | | Calcium carbonate (3 μm) Filler, Fine particle size and narrow distribution | 3 μm | 0.003 | IMERYS Carbonates |
| Remind 15** | | Calcium carbonate (20 μm) Filler, processed and pre-consumer recycled | 20 μm | 8 | IMERYS Carbonates |
| GAMACO** | | Calcium carbonate (3 μm) Filler, premium fine particle size | 3 μm | 0.003 | IMERYS Carbonates |
| #8 White** | | Calcium carbonate (12 μm) Filler; narrow distribution | 12 μm | 0.8 | IMERYS Carbonates |
| Microwhite 100** | | Calcium carbonate (25 μm) Filler, medium particle size | 25 μm | 20 | IMERYS Carbonates |
| Dynasylan ® GLYMO | Adhesion Promoter | 3-glycidoxypropyltrimethoxysilane | | | Evonik Corporation |

TABLE 1-continued

Raw materials: Role and details

| Ingredients | Role | Details | Equivalent Spherical Mean Diameter | Plus 325 Mesh, % | Supplier |
|---|---|---|---|---|---|
| SYLOSIV® A3 | Mol sieves | 3 A° aluminosilicate | | | W. R. Grace & Co |
| AEROSIL® 202 | Rheology Modifier | Polydimethylsiloxane treated fumed silica | | | Evonik Corporation |
| JEFFCAT® DMDEE | catalyst | 2,2'-dimorpholinodiethylether | | | Aldrich Chemicals |

\* Second Filler; \*\* First Filler

Prepolymer Synthesis

Purge the VORANOL™ 2000LM and VORANOL™ CP6001 with dry nitrogen at 60° C. until the water content of the polyols is less than 200 parts per million (ppm). For the prepolymer synthesis, prepare a 4-neck round bottom flask equipped with a mechanical stirrer, a thermocouple and a nitrogen inlet. Introduce the 80 grams (g) of VORANOL™ 2000LM and 80 g VORANOL™ CP6001 into the round bottom flask under dry nitrogen (N2) gas and mix for 5 minutes to form a polyol mixture. Add 40 g of ISONATE™ 50 OP to the polyol mixture and mix for 5 minutes to form a polyol/isocyanate mixture. Add Tin(II) 2-ethylhexanoate (T9 catalyst) to the polyol/isocyanate mixture at concentration of 50 parts per million (based on the polyol/isocyanate mixture) and heat with stirring to 70° C. Maintain the mixture at 70° C. for 2 hours until the reaction is complete as determined by the % NCO titration. The target isocyanate content is 4.13±0.01 wt. %. Cool the prepolymer for use in the formulation. Examples and Comparative Examples provided herein.

Formulating the Adhesive Composition

All vacuum in preparing Examples and Comparative Examples is at 26 inch Hg, 88 KPa. Prepare the Examples and Comparative adhesive compositions, as provided herein, in a one (1) Quart Double Planetary ROSS mixer (Ross & Son Company). The general procedure to prepare the Examples and Comparative adhesive compositions is as follows. For the Examples (EX) and Comparative Examples (CE), add the components in the amounts (values give as weight percent based on the total weight of the composition) indicated in Tables 2-6 to the ROSS mixer as follows. First, add the Prepolymer and the Plasticizer to form a liquid component. Warm the liquid component in the ROSS mixer to 50° C. and mix at 22 rotations per minute (rpm) for 30 minutes under vacuum. After 30 minutes, release the vacuum under nitrogen to check if the liquid component is degassed and that it is a clear liquid. Next, add the Molecular Sieves and mix at 22 rpm under vacuum for 30 minutes. After mixing, release the vacuum under nitrogen and confirm the homogeneity of the liquid component system. Add the First Filler to the liquid component system and mix for 30 minutes. Next, add the Second Filler to the liquid component system and the First Filler and mix under vacuum for 30 minutes. After complete addition of the filler(s), release the vacuum under nitrogen. Add the Rheology Modifier and mix for 20 minutes under vacuum. This is followed by the addition of the Adhesion Promoter and mixing for 20 minutes under vacuum. Release the vacuum under nitrogen and sample the formulated system for the viscosity and rheology testing. Add the catalyst (750 ppm based on the formulated system) to the formulated system and mix for 20 minutes under vacuum to form the adhesive composition. Fill the adhesive composition into a cartridge under nitrogen for further testing.

TABLE 2

Experiment Set 1, Effect of Individual Filler on Viscosity and Rheology

| | EXPERIMENT NUMBER | | | | | | |
|---|---|---|---|---|---|---|---|
| Ingredients | Comparative Example (CE) A | CE B | CE C | CE D | CE E | CE F | CE G |
| Prepolymer | 29.9 | 29.9 | 29.9 | 29.9 | 29.9 | 29.9 | 29.9 |
| SOYGOLD® 1100 | | | | | | | |
| DINP (Diisononyl phtalate) | 14 | 14 | 14 | 14 | 14 | 14 | 14 |
| CC-103 | 52 | | | | | | |
| KaMIN® 100 | | 52 | | | | | |
| Atomite | | | 52 | | | | |
| Remind 15 | | | | 52 | | | |
| GAMACO | | | | | 52 | | |

TABLE 2-continued

Experiment Set 1, Effect of Individual Filler on Viscosity and Rheology

| Ingredients | EXPERIMENT NUMBER | | | | | | |
|---|---|---|---|---|---|---|---|
| | Comparative Example (CE) A | CE B | CE C | CE D | CE E | CE F | CE G |
| #8 White | | | | | | 52 | |
| Microwhite 100 | | | | | | | 52 |
| (3-glycidoxypropyl)trimethoxysilane | 1 | 1 | 1 | 1 | 1 | 1 | 1 |
| Molecular sieves 3A | 1 | 1 | 1 | 1 | 1 | 1 | 1 |
| AEROSIL 201 | 2 | 2 | 2 | 2 | 2 | 2 | 2 |
| DMDEE | 0.1 | 0.1 | 0.1 | 0.1 | 0.1 | 0.1 | 0.1 |
| TOTAL | 100 | 100 | 100 | 100 | 100 | 100 | 100 |
| Rheology (G'G" Cross-over, Hz) | Not Stable formulation | 1.9 | 0.4 | 2.5 | 0.5 | 0.3 | |
| Viscosity, 0.01 1/s Shear rate, Pa-s | | | 2052 | 1482 | 3292 | 2236 | 1758 |

Measure the viscosity of the adhesive composition for each Example and Comparative Example using an AR 2000 Rheometer (TA Instruments) equipped with a 25 mm steel parallel plate and a gap of 450 μm. Erase the shear history of the sample by pre-shearing the adhesive composition at a shear rate 100 1/s for 30 sec at 25° C. Measure the viscosity and cross-over point at a steady state flow step at 25° C. isothermal temperature with a shear rate ramp from 100 Hz to $10^{-5}$ Hz.

FIG. 1 provides the viscosity of Comparative Examples C-G seen in Table 2 as a function of shear rate. As can be seen from FIG. 1, the adhesive compositions are highly shear thinning, indicating that these materials will begin to flow when subjected to stress. Since these adhesive compositions contain more than one phase, they are considered structured fluids and their rheological flow behavior is dominated by the interaction of the solid and the liquid phases. When these interactions are disrupted by the applied shear the structure of the material breaks down and flow occurs. This point of critical stress level is referred to as the yield stress and for the present disclosure is considered to be the ease of initiation of the troweling process for the adhesive composition, which in turn is directly correlated to the viscosity of the material. Higher viscosity indicates difficulty in the troweling process for the adhesive composition. As seen in FIG. 1, the viscosity of each adhesive composition shows a correlation between the filler particle size and the viscosity of the adhesive composition. Larger particle size formulations have lower packaging density and as a results lower viscosity. However, the relatively smaller filler particle size formulation results in a highly packed formulation resulting in higher viscosity. The viscosity data indicated in Pa·s in the table are at a 0.01 1/s shear rate. This is the typical shear rates that would occur in applying the adhesive composition with a trowel.

The ridge retention of the troweled adhesive composition is studied using oscillatory rheology, which helps to determine the viscoelastic behavior of these structure fluids. This is determined by subjecting the adhesive composition to a cyclic variation of stress and strain. The viscoelastic behavior of the adhesive composition is characterized by the storage modulus, G', and the loss modulus, G", which respectively characterize the solid-like and fluid-like contributions to the measured stress response. The strain amplitude dependence on the storage (G') and loss (G") moduli as a function of frequency of oscillation helps determine the flow behavior of the adhesive composition. After the cross-over point of (G') and loss (G") where G" overtakes G' indicated a flow behavior and loss of ridge retention. As seen in Table 2, smaller particles help with higher cross-over frequency indicating that higher strain amplitude is required to disrupt the interaction and induce the flow, hence a higher amount of shear can be tolerated by these adhesive compositions. However, this higher frequency is attained at a higher viscosity.

TABLE 3

Experiment Set 2, Effect of a Filler Blend (50/50) on Viscosity (at 0.01 1/s shear rate) and Rheology

| Ingredients | EXPERIMENT NUMBER | | | |
|---|---|---|---|---|
| | CE H | CE I | CE J | CE K |
| Prepolymer | 30 | 30 | 30 | 30 |
| SOYGOLD ® 1100 | 0 | 0 | 0 | 0 |
| DINP (Diisononyl phtalate) | 14 | 14 | 14 | 14 |
| CC-103 | 26.02 | 26.02 | 26.02 | 26.02 |
| KaMIN ® 100 | 26.02 | | | |
| Atomite | | 26.02 | | |
| Remind 15 | | | 26.02 | |
| GAMACO | | | | 26.02 |
| (3-glycidoxypropyl)trimethoxysilane | 1 | 1 | 1 | 1 |
| Molecular sieves 3A | 1 | 1 | 1 | 1 |
| AEROSIL 202 | 1.99 | 1.99 | 1.99 | 1.99 |
| DMDEE | 0.1 | 0.1 | 0.1 | 0.1 |
| TOTAL | 100 | 100 | 100 | 100 |
| Rheology (G'G" Cross-over, Hz) | 6.31 | 0.8 | 1.9 | 0.4 |

Figure 2:
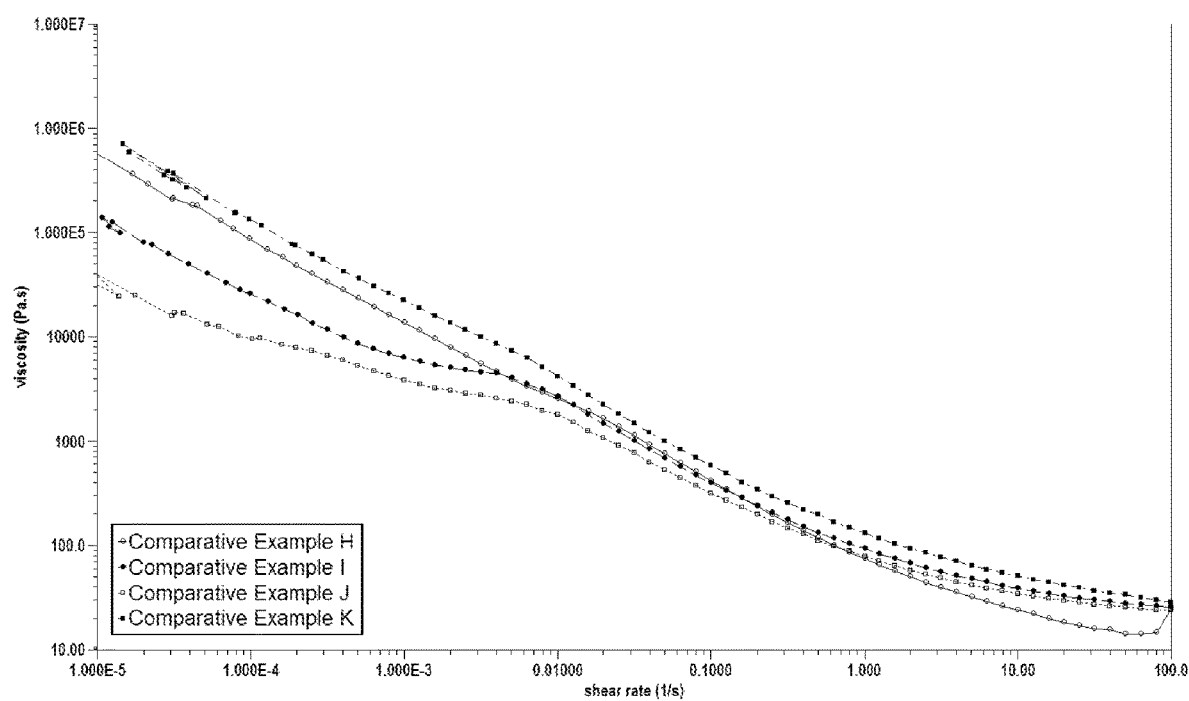
FIG. 2 provides the viscosity of Comparative Examples H-K seen in Table 3 as a function of shear rate.

FIG. 2 provides the viscosity of Comparative Examples H-K seen in Table 3 as a function of shear rate. As can be seen from FIG. 2, the adhesive compositions are shear thinning, indicating that these materials will begin to flow when subjected to stress. FIG. 2 also indicates that the viscosity of each adhesive composition having two fillers in a 1:1 ratio shows a correlation between the combination of filler particle sizes (larger filler particles, e.g. CC-103 and Remind 15, and smaller particles, e.g. KaMIN 100, Atomite and GAMACO) and the viscosity of the adhesive composition. The combination of larger and smaller particle size formulations in the presence of the DINP plasticizer has a higher packaging density and as a result a higher viscosity (e.g., greater than 1,000 Pa·s) at shear rates that would typically be used in applying the adhesive composition with a trowel. However, the combination of two relatively larger filler particle sizes in the adhesive composition results in a relatively less densely packed formulation resulting in a lower relative viscosity. The viscosity data indicated in Pa·s in the table are at a 0.01 1/s shear rate. This is the typical shear rates that would occur in applying the adhesive composition with a trowel.

Table 3 also illustrates that smaller particles help with higher cross-over frequency indicating that higher strain amplitude is required to disrupt the interaction and induce the flow, hence a higher amount of shear can be tolerated by these adhesive compositions. It is noteworthy that the cross-over value for CE H having small particles of aluminum silicate (KaMIN® 100) is much higher than those comparable adhesive compositions CE I-CE K that have small particles of calcium carbonate (Atomite and GAMACO). However, this higher frequency for CE H is attained at a higher viscosity, which is a drawback for this formulation.

TABLE 4

Experiment Set 3, Effect of SOY GOLD Plasticizer and Filler Blend (50/50) on Viscosity (at 0.01 1/s shear rate) and Rheology

| | EXPERIMENT NUMBER | | |
|---|---|---|---|
| Ingredients | CE H | CE L | Example (EX) 1 |
| Prepolymer | 30 | 30 | 30 |
| SOYGOLD ® 1100 | 0 | 0 | 14 |
| DINP (Diisononyl phtalate) | 14 | 14 | 0 |
| CC-103 | 26.02 | 26.02 | 26.02 |
| KaMIN ® 100 | 26.02 | | |
| Atomite | | | |
| Remind 15 | | 26.02 | 26.02 |
| GAMACO | | | |
| (3-glycidoxypropyl)trimethoxysilane | 1 | 1 | 1 |
| Molecular sieves 3A | 1 | 1 | 1 |
| AEROSIL 202 | 1.99 | 1.99 | 1.99 |
| DMDEE | 0.1 | 0.1 | 0.1 |
| TOTAL | 100 | 100 | 100 |
| Rheology (G'G" Cross-over, Hz) | 6.31 | 1.9 | 10 |

Figure 3:
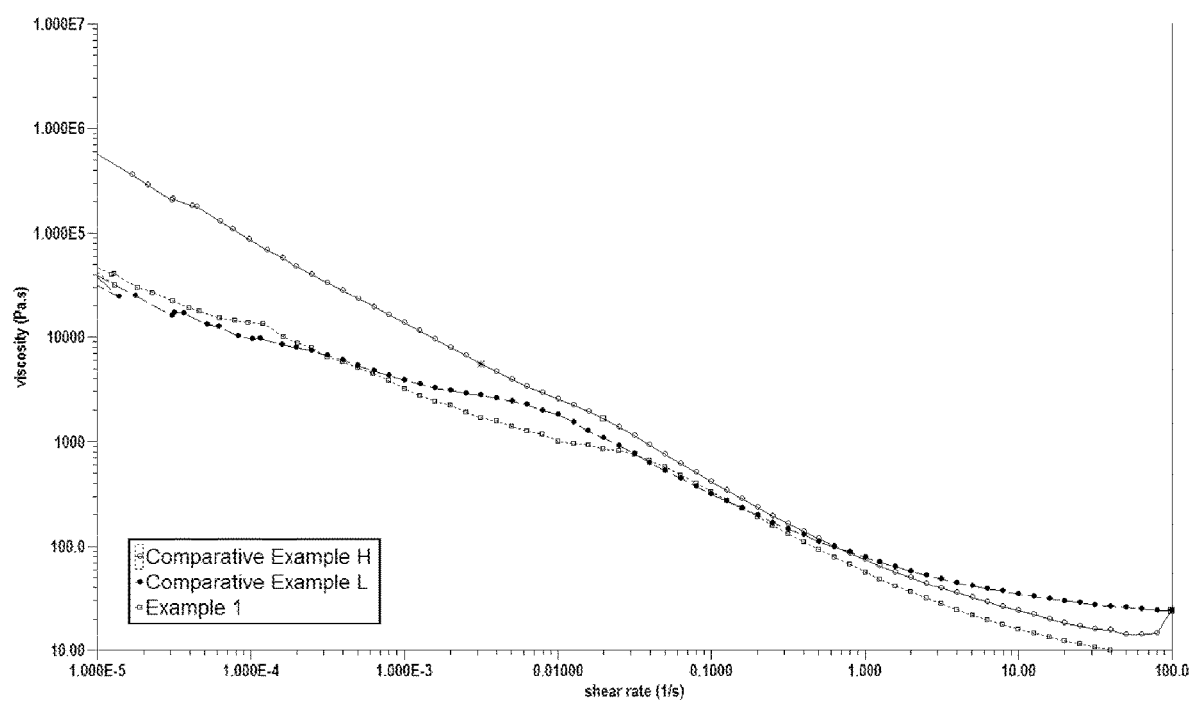
FIG. 3 provides the viscosity of Comparative Examples H and L and Example 1 seen in Table 4 as a function of shear rate.

FIG. 3 provides the viscosity of Comparative Examples H and L and Example 1 seen in Table 4 as a function of shear rate. As can be seen from FIG. 3, the adhesive compositions are shear thinning, indicating that these materials will begin to flow when subjected to stress. FIG. 3 also indicates that the viscosity of each adhesive composition having two fillers in a 1:1 ratio shows a correlation between the combination of filler particle sizes (larger filler particles, e.g. CC-103 and Remind 15, and smaller particles, e.g. KaMIN 100, Atomite and GAMACO) and the viscosity of the adhesive composition. The combination of larger and smaller particle size formulations in the presence of the DINP plasticizer has a higher packaging density and as a result a higher viscosity (e.g., greater than 1,000 Pa·s) at shear rates that would typically be used in applying the adhesive composition with a trowel. In contrast, the use of SOYGOLD® 1100 as the plasticizer in EX 1, as compared to CE L, clearly shows the synergistic result of combining the calcium carbonate filler system with the seed oil based fatty acid ester of the present disclosure at the typical shear rates that would occur in applying the adhesive composition with a trowel. It is also noteworthy that the crossover value for EX 1 have larger particles of calcium carbonate (CC-103 and Remind 15, relative to Atomite and GAMACO) is significantly higher than CE L, where the only difference is the use of the seed oil based fatty acid ester plasticizer in EX 1 as compared to the DINP plasticizer in CE L.

TABLE 5

Experiment Set 4, Effect of Filler Blend (75/25) on Viscosity (at 0.01 1/s shear rate) and Rheology

| | EXPERIMENT NUMBER | | | |
|---|---|---|---|---|
| Ingredients | CE M | CE N | CE O | CE P |
| Prepolymer | 30 | 30 | 30 | 30 |
| SOYGOLD ® 1100 | 0 | 0 | 0 | 0 |
| DINP (Diisononyl phtalate) | 10 | 10 | 10 | 10 |
| CC-103 | 43.5 | 43.5 | 43.5 | 43.5 |
| KaMIN ® 100 | 13.6 | | | |
| Atomite | | 13.6 | | |
| Remind 15 | | | 13.6 | |
| GAMACO | | | | 13.6 |
| (3-glycidoxypropyl)trimethoxysilane | 1 | 1 | 1 | 1 |
| Molecular sieves 3A | 1 | 1 | 1 | 1 |
| AEROSIL 202 | 0.8 | 0.8 | 0.8 | 0.8 |
| DMDEE | 0.1 | 0.1 | 0.1 | 0.1 |
| TOTAL | 100 | 100 | 100 | 100 |
| Rheology (G'G" Cross-over, Hz) | 0.5 | 0.63 | 0.8 | 2.5 |

Figure 4:
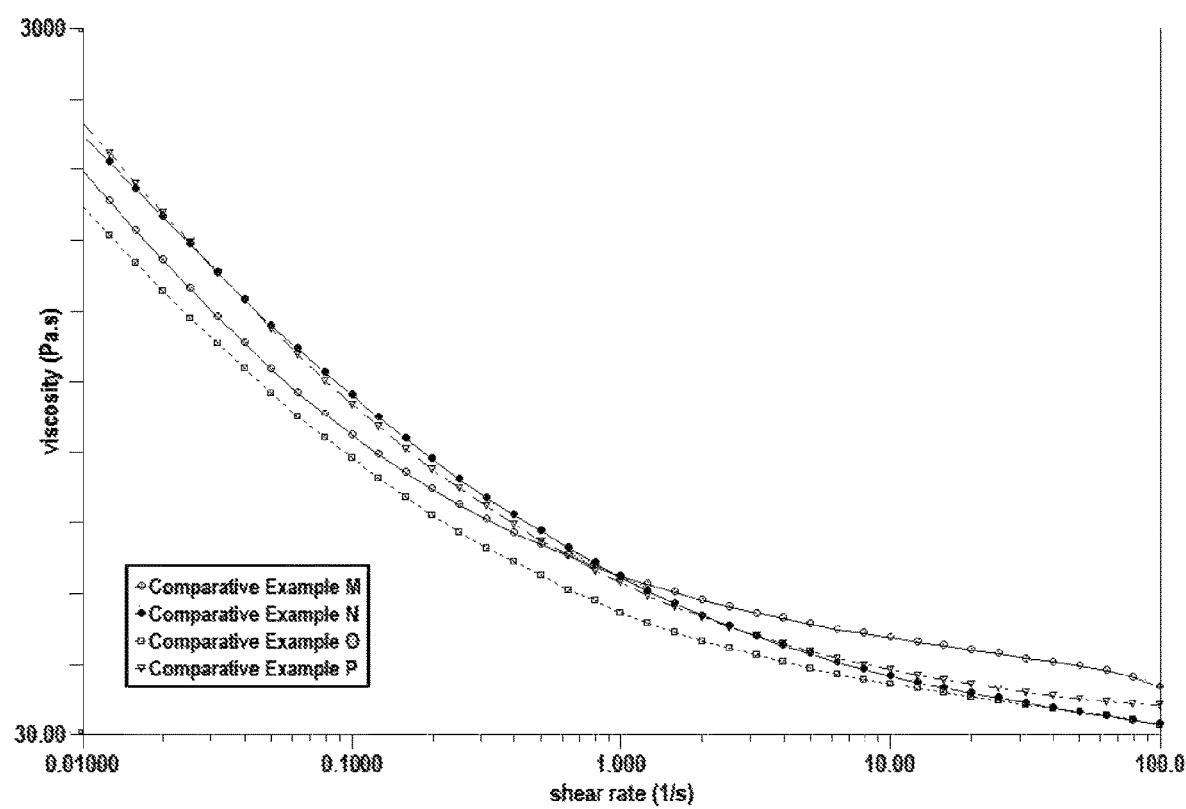
FIG. 4 provides the viscosity of Comparative Examples M-P seen in Table 5 as a function of shear rate.

FIG. 4 provides the viscosity of Comparative Examples M-P seen in Table 5 as a function of shear rate. As can be seen from FIG. 4, the adhesive compositions are shear thinning, indicating that these materials will begin to flow when subjected to stress. FIG. 4 also indicates that the viscosity of each adhesive composition having two fillers in a 3:1 ratio shows a correlation between the combination of filler particle sizes (larger filler particles, e.g. CC-103 and Remind 15, and smaller particles, e.g. KaMIN 100, Atomite and GAMACO) and the viscosity of the adhesive composition. The combination of larger and smaller particle size formulations in the presence of the DINP plasticizer has a higher packaging density and as a result in a higher viscosity (e.g., greater than 1,000 Pa·s) at shear rates that would typically be used in applying the adhesive composition with a trowel. However, the combination of two relatively larger filler particle sizes in the adhesive composition results in a less highly dense packed formulation resulting in a lower relative viscosity. The viscosity data indicated in Pa·s in the table are at a 0.01 1/s shear rate. This is the typical shear rates that would occur in applying the adhesive composition with a trowel.

Table 5 also illustrates that smaller particles help with higher cross-over frequency indicating that higher strain amplitude is required to disrupt the interaction and induce the flow, hence a higher amount of shear can be tolerated by these adhesive compositions. It is noteworthy that the cross-over value for CE P having small particles of calcium carbonate (GAMACO) is much higher than those comparable adhesive compositions CE M-CE O that have small particles of a different calcium carbonate (Atomite) or aluminum silicate (KaMIN).

TABLE 6

Experiment Set 5, Effect of SOY GOLD Plasticizer and filler blend (75/25) on Viscosity (at 0.01 1/s shear rate) and Rheology

| Ingredients | EXPERIMENT NUMBER | | | |
|---|---|---|---|---|
| | CE Q | CE R | CE S | EX 2 |
| Prepolymer | 30 | 30 | 30 | 30 |
| SOYGOLD ® 1100 | 0 | 0 | 0 | 10 |
| DINP (Diisononyl phtalate) | 10 | 10 | 10 | 0 |
| CC-103 | 43.5 | 43.5 | 43.5 | 43.5 |
| GAMACO | 13.5 | 13.5 | 12.5 | 12.5 |
| (3-glycidoxypropyl)trimethoxysilane | 1 | 1 | 1 | 1 |
| Molecular sieves 3A | 1 | 1 | 1 | 1 |
| AEROSIL 202 | 0.8 | 0.8 | 2 | 2 |
| DMDEE | 0.1 | 0.1 | 0.1 | 0.1 |
| TOTAL | 100 | 100 | 100 | 100 |
| Rheology (G'G" Cross-over, Hz) | 6.31 | 2.5 | 3.5 | 15.8 |

Figure 5:
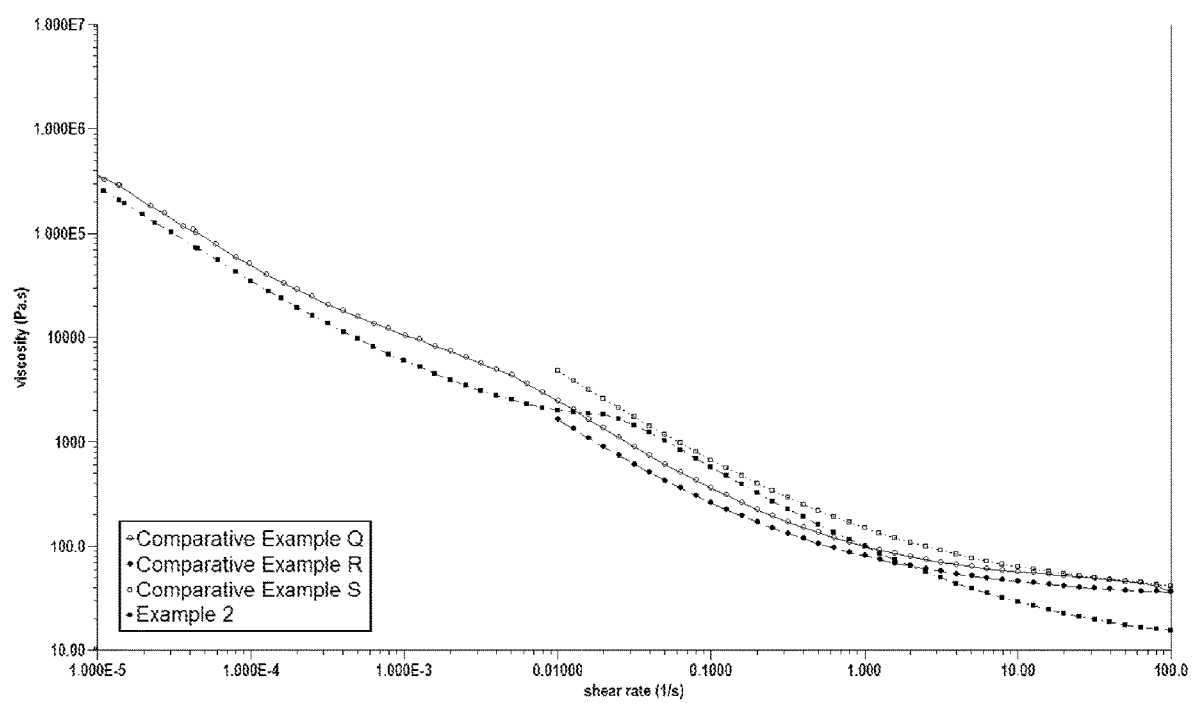
FIG. 5 provides the viscosity of Comparative Examples Q-S and Example 2 seen in Table 6 as a function of shear rate.

FIG. 5 provides the viscosity of Comparative Examples Q-S and Example 2 seen in Table 6 as a function of shear rate. As can be seen from FIG. 5, the adhesive compositions are shear thinning, indicating that these materials will begin to flow when subjected to stress. FIG. 5 also indicates that the viscosity of each adhesive composition having two fillers in a 3:1 ratio shows a correlation between the combination of filler particle sizes (larger calcium carbonate filler particles, e.g. CC-103 and smaller calcium carbonate particles, e.g., GAMACO) and the viscosity of the adhesive composition. The combination of larger and smaller calcium carbonate particle size formulations in the presence of the DINP plasticizer have higher packaging density and result in higher viscosity (e.g., greater than 1,000 Pa·s) at shear rates that would typically be used in applying the adhesive composition with a trowel. In contrast, the use of SOY-GOLD® 1100 as the plasticizer in EX 2, as compared to CE S, clearly shows the synergistic result of combining the calcium carbonate filler system with the seed oil based fatty acid ester of the present disclosure at the typical shear rates that would occur in applying the adhesive composition with a trowel. It is also noteworthy that the crossover value for EX 2 have larger particles of calcium carbonate (CC-103 relative to GAMACO) is significantly higher than CE S, where the only difference is the use of the seed oil based fatty acid ester plasticizer in EX 2 as compared to the DINP plasticizer in CE S. It is believed that this result might be attributed to the broader particle distribution calcium carbonate seen in CC103 and Remind 15, where when blended with fine particle distribution calcium carbonate such as GAMACO, this results in improving the packing of the filler. In addition, the presence of a methyl ester based soy plasticizer with its hydrophobic chains may help to improve the chain entanglement of the polymer. As a result, the combination of filler packaging with chain entanglements results in organized and interactive structure of the phases in the formulated system.

What is claimed is:

1. An adhesive composition, comprising:
   20 to 50 weight percent (wt. %) of a moisture curable polymer system;
   30 to 60 wt. % of a calcium carbonate filler system, the calcium carbonate system having:
   5 to 50 wt. % of a first spheroidal particle of calcium carbonate having an equivalent spherical mean diameter of 70 nanometer (nm) to 15 micrometer (μm); and
   50 to 95 wt. % of a second spheroidal particle of calcium carbonate having an equivalent spherical mean diameter of greater than 15 μm to 200 μm, wherein
   the wt. % of the first spheroidal particle and the second spheroidal particle are based on the total weight of the calcium carbonate filler system;
   5 to 15 wt. % of a seed oil based fatty acid ester; and
   0.1 to 10 wt. % of a silane based adhesion promoter, wherein the wt. % of the moisture curable polymer system, the calcium carbonate filler system, the seed oil based fatty acid ester and the silane based adhesion promoter are based on the total weight of the adhesive composition.

2. The adhesive composition of claim 1, wherein the adhesive composition further includes 0.5 to 4 wt. % of a silica based rheology modifier, wherein the wt. % is based on the total weight of the adhesive composition.

3. The adhesive composition of claim 1, wherein the moisture curable polymer system is solvent free.

4. The adhesive composition of claim 1, wherein the moisture curable polymer system is a reaction product of an isocyanate component and a polyol component, the moisture curable polymer system having a free isocyanate content (% NCO) from 1 weight percent (wt. %) to 14 wt. %.

5. The adhesive composition of claim 4, wherein the polyol component is selected from the group consisting of a polyether polyol, a polyester polyol and a combination thereof.

6. The adhesive composition of claim 5, wherein the polyol component has a number average molecular weight of 1,000 g/mol to 6,000 g/mol.

7. The adhesive composition of claim 4, wherein the isocyanate component has a number average molecular weight of 500 g/mol to 12,000 g/mol.

8. The adhesive composition of claim 4, wherein the isocyanate component is selected from the group consisting of an aromatic diisocyanate, an aliphatic diisocyanate, a cycloaliphatic diisocyanate and combinations thereof.

9. The adhesive composition of claim 1, wherein the calcium carbonate filler system does not include an aluminum silicate.

10. The adhesive composition of claim 1, wherein the seed oil based fatty acid ester is a methyl ester produced from soybean oil.

11. The adhesive composition of claim 1, wherein the adhesive composition has a viscosity of 500 Pa·s to 10000 Pa·s at 0.01 1/s shear rate.

12. The adhesive composition of claim 1, wherein the adhesive composition has a viscosity of 800 Pa·s and 5000 Pa·s at 0.01 1/s shear rate.

13. The adhesive composition of claim 1, wherein the adhesive composition has a cross-over point between 0.5 hz and 25 hz in an uncured state.

14. The adhesive composition of claim 1, wherein the calcium carbonate filler system includes:
   25 to 50 wt. % of the first spheroidal particle of calcium carbonate; and
   50 to 75 wt. % of the second spheroidal particle of calcium carbonate, wherein the wt. % of the first spheroidal particle and the second spheroidal particle are based on the total weight of the calcium carbonate filler system.

15. The adhesive composition of claim 14, wherein the first spheroidal particle of calcium carbonate has an equivalent spherical mean diameter of 2 μm to 5 μm; and the second spheroidal particle of calcium carbonate has an equivalent spherical mean diameter of 20 μm to 30 μm.

16. The adhesive composition of claim 15, wherein the seed oil based fatty acid ester is a methyl ester produced from soybean oil.

\* \* \* \* \*